United States Patent
Ed

(10) Patent No.: US 6,994,186 B2
(45) Date of Patent: Feb. 7, 2006

(54) HELICOPTER LINEMAN'S LADDER

(75) Inventor: Darryl K. Ed, Gettysburg, PA (US)

(73) Assignee: Haverfield Corporation, Carroll Valley, PA (US)

( * ) Notice: Subject to any disclaimer, the term of this patent is extended or adjusted under 35 U.S.C. 154(b) by 0 days.

(21) Appl. No.: 10/868,141

(22) Filed: Jun. 15, 2004

(65) Prior Publication Data

US 2004/0222041 A1    Nov. 11, 2004

Related U.S. Application Data

(63) Continuation of application No. 10/036,387, filed on Jan. 7, 2002, now Pat. No. 6,769,514.

(51) Int. Cl.
*E04G 3/10*    (2006.01)

(52) U.S. Cl. ................ 182/150; 182/206; 182/46; 182/93

(58) Field of Classification Search ........... 182/150, 182/115, 206, 46, 194
See application file for complete search history.

(56) References Cited

U.S. PATENT DOCUMENTS

| | | | | |
|---|---|---|---|---|
| 166,883 A | * | 8/1875 | Miller | 182/119 |
| 285,471 A | * | 9/1883 | Doane | 182/196 |
| 694,771 A | * | 3/1902 | Monroe | 182/27 |
| 901,565 A | * | 10/1908 | Thomson | 182/180.2 |
| 1,545,348 A | * | 7/1925 | Nalder | 182/169 |
| 1,942,210 A | * | 1/1934 | Walder | 182/22 |
| 2,760,707 A | * | 8/1956 | Anderson | 182/115 |
| 2,858,055 A | * | 10/1958 | De Long et al. | 182/116 |
| 3,402,786 A | * | 9/1968 | White et al. | 182/46 |
| 3,954,156 A | * | 5/1976 | Kennedy | 182/107 |

* cited by examiner

*Primary Examiner*—Alvin Chin-Shue
(74) *Attorney, Agent, or Firm*—Stuart J. Friedman

(57) ABSTRACT

A rigid, unitary ladder is provided having one end configured to be attached to a powerline support tower after the ladder is dropped by helicopter to a lineman previously offloaded onto the tower. The ladder includes a first section which extends outwardly from the tower and a second section which extends at an angle at least equal to ninety degrees from an end of the first section to a base which is configured to rest on the powerline, the angle being defined between the undersides of the first and second ladder sections. The first section is of a length sufficient to space the base a distance from the tower which is beyond the flashover area around the tower.

4 Claims, 2 Drawing Sheets

HELICOPTER LINEMAN'S LADDER

CROSS REFERENCE TO RELATED APPLICATIONS

This application is a continuation of U.S. application Ser. No. 10/036,387, filed Jan. 7, 2002 now U.S. Pat. No. 6,769,514.

BACKGROUND OF THE INVENTION

High voltage powerlines carrying voltages in the hundreds of kilowatt range have been constructed to extend from spaced towers high above terrain which is often practically inaccessible to land vehicles. In recent years, a number of methods and devices have been developed to facilitate the repair of remote high voltage powerlines which are accessed by helicopter.

Helicopter transported landing platforms and work scaffolds which can be attached to the cross arm of a utility pole have been developed to permit a lineman to disembark from a helicopter and descend vertically along the utility pole to the powerlines supported thereby. Such devices are heavy and bulky, and are often difficult to maneuver. More importantly, however, is the fact that these devices position a lineman in close proximity to a grounded utility pole, so that the powerlines must be deenergized before repair can occur. Otherwise it is dangerous for a lineman to remain in the electrically charged space between energized high voltage conductors and a grounded tower or utility pole. A helicopter-mountable landing platform and work scaffold adapted to be mounted by a utility pole is illustrated in U.S. Pat. No. 3,863,736 to McWilliams.

In order to avoid an extensive power outage which might occur when a high voltage powerline is deenergized for repair, it is desirable to provide live maintenance on energized high voltage conductors. To accomplish this, linemen first bond to the energized transmission line to become energized to the same potential as that of the line. This permits the lineman to work safely on the energized line so long as he maintains sufficient spacing from grounded structures, such as support towers, to prevent the risk of flashover. To facilitate live maintenance on energized high voltage powerlines, various lineman support structures have been developed which are suspended from a helicopter over a powerline pair remote from the support towers. These support structures are formed either partially or totally from electrically conductive material and include skids or rollers which engage a pair of parallel lines. Such lineman support structures are shown by U.S. Pat. No. 4,478,312 to Kurtgis and U.S. Pat. No. 5,494,132 to Hansen. Not only are these structures bulky and somewhat cumbersome, but it is difficult to position the conductive skids or rollers on the energized powerline pair from a helicopter. Also, these support structures may inadvertently move into dangerous proximity with a grounded tower structure.

In an attempt to eliminate bulky, difficult to position, linemen support platforms, systems have been developed for lowering a lineman from a helicopter directly onto an energized powerline. U.S. Pat. No. 4,673,059 to Kurtgis discloses such a system. Not only is there some difficulty in accurately positioning a lineman at the end of an elongate, swinging cable adjacent to an energized powerline for a time sufficient to complete a safe interconnection with the powerline, but once on the powerline, the lineman, through inattention, may move too close to a grounded tower.

SUMMARY OF THE INVENTION

It is a primary object of the present invention to provide a novel and improved helicopter lineman's ladder and method which permits a lineman to be directly landed from a helicopter onto a stable powerline support tower.

Another object of the present invention is to provide a novel and improved lineman's ladder which is lightweight and which can be lowered from a helicopter and easily positioned between a tower cross arm and energized conductors by a single lineman.

Yet another object of the present invention is to provide a novel and improved helicopter lineman's ladder which will deliver a lineman from a tower to energized powerlines and insure that the lineman is a safe distance from the tower before the lineman bonds to an energized powerline.

A still further object of the present invention is to provide a novel and improved helicopter lineman's ladder which operates to prevent a lineman who has bonded to an energized powerline from inadvertently moving dangerously close to a grounded tower.

These and other objects of the present invention are achieved by providing a rigid ladder having one end which hooks to a powerline support bridge after the ladder is dropped by helicopter. The ladder includes a first section which extends out from the support bridge for the flashover distance to the tower or more, and a second section that extends downwardly from the outer end of the first section to a base which rests on the powerlines spaced from the support bridge. A weight on the base holds it against the powerlines, and the complete structure is formed of electrically nonconductive material. Using this structure, when a lineman hooks up to the powerline, he will be more than the flashover distance from the support bridge.

DESCRIPTION OF THE PREFERRED EMBODIMENTS

Figure 1:
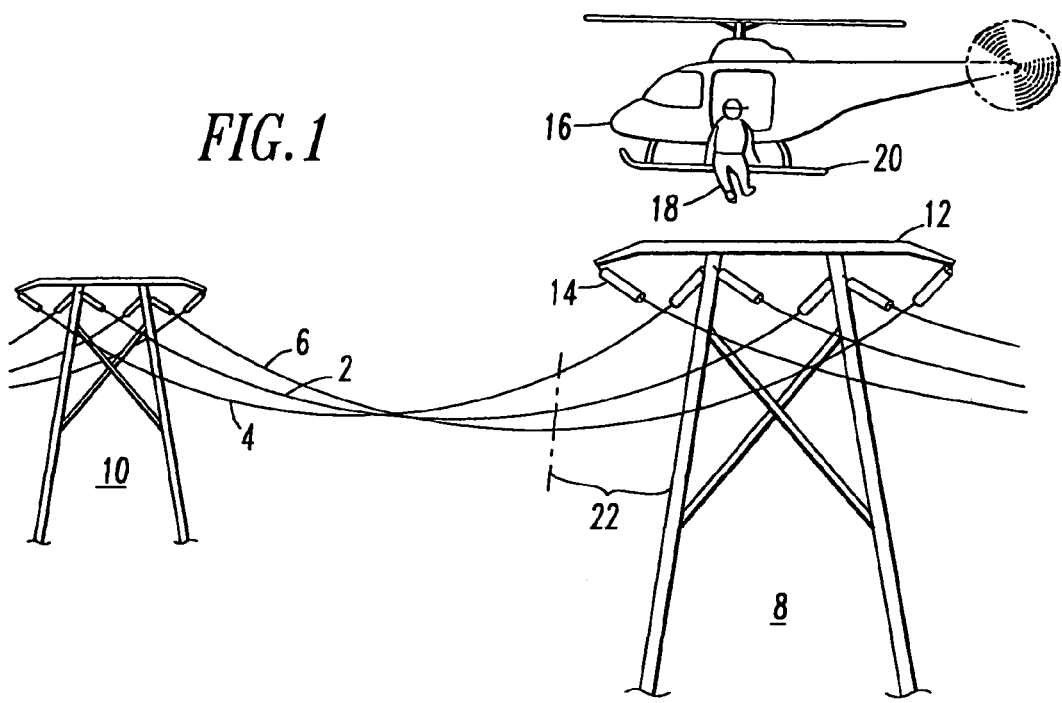
FIG. 1 is a perspective view of high voltage tower supported powerlines.

With reference to FIG. 1, high voltage AC transmission lines normally include at least three powerline conductors 2, 4 and 6, with each powerline conductor carrying a voltage which is 120° out of phase with the voltages carried by the remaining conductors. These powerline conductors extend over substantial distances and are supported to extend between spaced towers 8 and 10. Each powerline conductor is suspended beneath a tower cross arm 12 by elongate insulators 14.

In accordance with the method of the present invention, a helicopter 16 offloads one or more linemen 18 directly onto a tower 8. This can be accomplished by having linemen sit on a helicopter skid 20 or upon a platform placed across the helicopter skids which extends laterally of the helicopter. By having the helicopter directly deposit linemen onto a stable tower structure which is insulated from the powerline conductors, unstable tethers which can swing a lineman into an energized powerline are eliminated.

Once the lineman is on the tower, the problem to be solved is how the lineman can safely descend to the energized powerline conductors 2, 4 and 6 and bond onto a conductor to raise his body voltage to the powerline conductor voltage. This cannot be done from the grounded tower structure or even from within an area close to the tower structure where flashover can occur. A flashover area, indicated at 22, must be avoided if live maintenance on energized powerline conductors is to be safely accomplished. OSHA safety regulations require that a flashover area of at least eleven feet from the tower be maintained for energized high voltage transmission line repair and that this area must be avoided by linemen bonded to a powerline conductor.

In accordance with the present invention, a one piece, unitary lineman's ladder indicated generally at 24 is provided to ensure that a lineman can safely descend from the tower, bond onto an energized conductor, accomplish conductor repair, and ascend back to the tower without danger of ever entering the flashover area 22 while energized. The lineman's ladder 24 includes a first elongate section 26 having a free end which terminates in a pair of spaced connectors 28 which are adapted to engage and be connected to the tower cross arm 12 of a tower 8. These connectors are shown as hooks in FIG. 1, but may take a number of forms to permit a lineman to positively lock the free end of the elongate section 26 to the tower cross arm. These connectors can be, for example, hooks with pivoted locking arms, hooks in combination with belts to secure the ladder to the cross arm, belts alone, or other known locking connectors to secure the ladder to the cross arm.

A second elongate section 30 of the lineman's ladder extends from the end of the section 26 at an angle no less than ninety degrees and which is preferably greater than ninety degrees. The section 30 terminates in a curved base bar 32 which extends outwardly on either side of the section 30 and terminates in downwardly turned ends 34 and 36. Extending below the base bar on a flexible tether 38 is a weight 40.

The elongate sections 26 and 30 of the lineman's ladder 24 are formed as ladder sections with spaced side bars 42 joined by cross rungs 44. All components of the lineman's ladder, including the sections 24 and 30, the connectors 28, the base bar 32, the tether 38 and the weight 40 are preferably formed of electrically nonconductive material. The ladder is very light weight and maneuverable and can easily be carried and lowered from a helicopter and secured in place by a lineman who was previously offloaded onto the tower 8.

An important feature of the lineman's ladder 24 is the length of the elongate section 26. The length of this section must be sufficient to insure that a lineman descending down the section 30 to an energized line is outside the flashover area 22. Ideally, the length of the section 26 is eleven feet or more to position the section 30 outside the flashover zone. The section 30 will normally be shorter than the section 24 as its length must merely be sufficient to enable a lineman to reach the conductors supported below the tower cross arm 12.

In accordance with the present invention, once the lineman is offloaded from the helicopter onto the tower, the lineman's ladder 24 is lowered to the lineman from the helicopter. Rings 46 may be secured to the sidebars 42 between the sections 26 and 30 to facilitate attachment to a helicopter cable. The lineman positions the ladder over a conductor or conductors and attaches the spaced connectors 28 to the tower cross arm 12. Then the base bar 32 is lowered into engagement with a conductor or conductors and is held in place by the tethered weight 40. The lineman now descends to the base bar, and while standing on the insulated base bar, bonds to the energized conductor. Now, the lineman can step onto the conductor to perform repairs. With the lineman's ladder in place, access to the flashover zone is blocked to prevent the lineman from inadvertently straying into the flashover zone while his attention is focused on repairing an energized conductor. Once the repair has been completed, the lineman steps back on the base bar 32 and terminates the bond with the energized conductor. Now the lineman can ascend back onto the tower 8, and assist in removal of the lineman's ladder by the helicopter.

Figure 2:
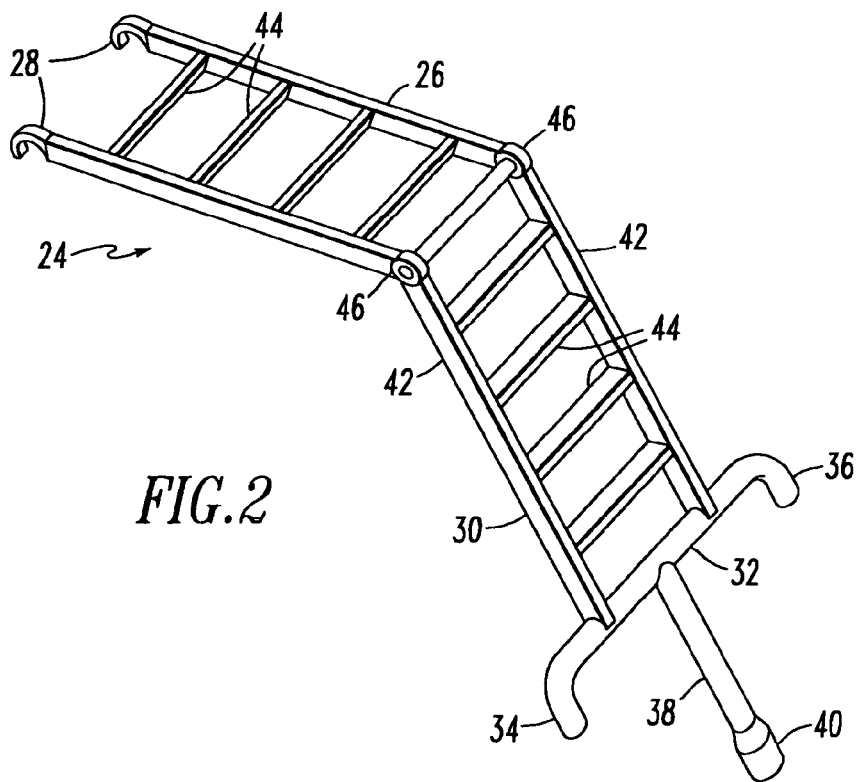
FIG. 2 is a perspective view of the helicopter lineman's ladder of the present invention.
Figure 3:
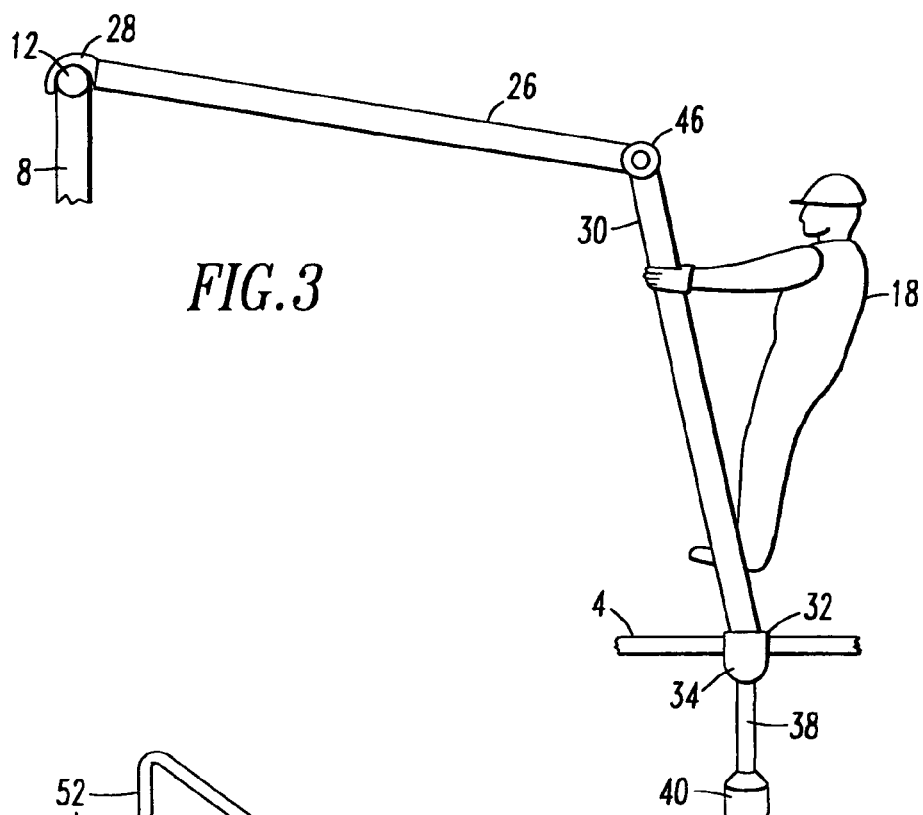
FIG. 3 is a view in side elevation of the helicopter lineman's ladder of FIG. 2.
Figure 4:
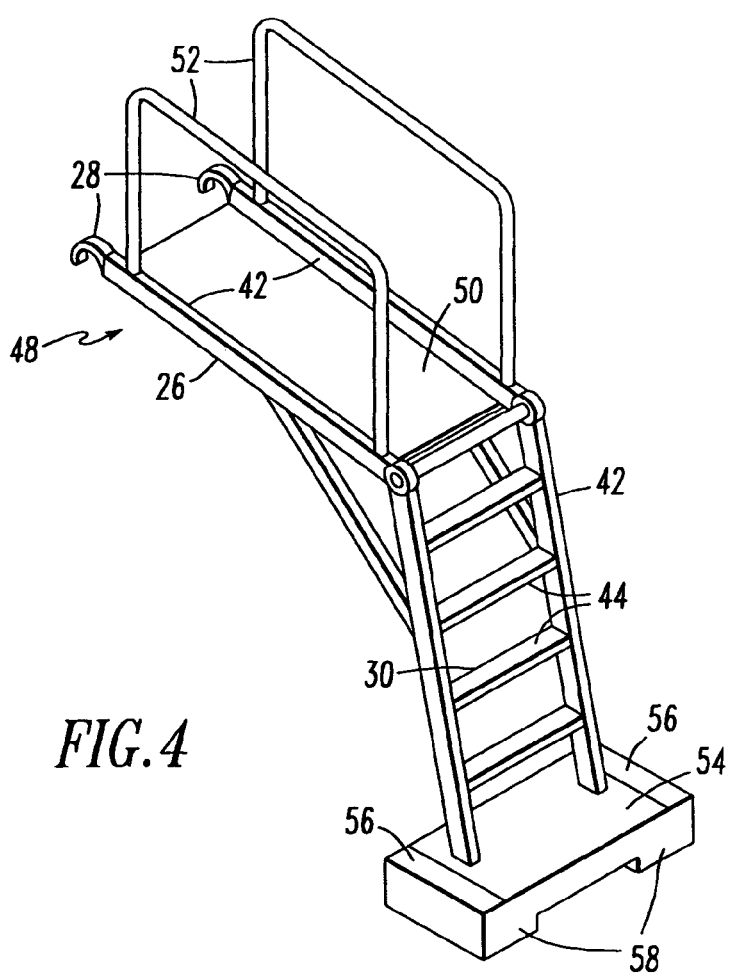
FIG. 4 is a perspective view of a second embodiment of the helicopter lineman's ladder of the present invention.

FIG. 4 illustrates a second embodiment of the unitary lineman's ladder which is indicated generally at 48. Here structural elements which are the same as those previously described with reference to FIGS. 2 and 3 will be designated with like reference numerals.

In the lineman's ladder 48, the ladder rungs 44 in elongate section 26 are eliminated and a solid ramp 50 extends between the sidebars 42. Also handrails 52 are attached to the sidebars 42 of the elongate section 26 on either side of the ramp 50. These handrails can be attached to a helicopter lowering cable.

In the lineman's ladder 48, the base bar 32, tether 38 and weight 40 of the lineman's ladder 24 are replaced by a platform 54 secured to the bottom of the section 30. This platform supports weights 56 shown by broken lines in FIG. 4 which hold the platform in engagement with an energized conductor. Downward spaced projections 58 formed on either side of the bottom of the platform 54 extend on either side of a conductor which the platform engages. Preferably, all components of the lineman's ladder 48 are formed of electrically nonconductive material.

I claim:

1. A helicopter lineman's ladder for positioning a lineman on an energized high voltage powerline conductor, said conductor being supported by a tower having a cross-arm, at a position outside a flashover area which extends at a distance around said tower, said ladder comprising:
   a first elongate ladder section having first and second ends;
   at least one connector mounted on said first end of said first elongate ladder section, said connector being configured for connecting said free end to the cross-arm of said tower;
   a second elongate ladder section having first and second ends;
   said first and second ladder sections each comprising two longitudinally extending sides connected by a plurality of longitudinally spaced apart rungs, said ladder sections having uppersides and undersides, said ladder adapted for having a lineman climb along the uppersides thereof;
   said first end of said second ladder section extending from said second end of said first ladder section at an angle at least equal to ninety degrees, said angle being defined between the undersides of said first and second ladder sections,
   a base secured to said second end of said second ladder section for resting on a powerline conductor beyond said flashover distance, said base extending laterally from both longitudinally extending sides of said second ladder section and including spaced apart, downward projections for positioning said base on said powerline conductor with the powerline conductor between said projections, an elongate flexible tether connected to said base and a weight connected to said tether in spaced relation to and below said base;

said first elongate ladder section being of sufficient length to position said base in contact with the powerline conductor at a point spaced from said tower which is a greater distance from said tower than said flashover distance when said connector connects the first end of said first ladder section to said cross-arm of said tower; and said first and second ladder sections being unitary and said helicopter lineman's ladder being formed of electrically non-conductive material.

2. The helicopter lineman's ladder of claim 1 wherein said first elongate ladder section is at least eleven feet in length.

3. The helicopter lineman's ladder of claim 2 wherein said second elongate ladder section is shorter in length than said first elongate ladder section.

4. The helicopter lineman's ladder of claim 1 wherein said base is formed by an elongate, electrically nonconductive bar.

* * * * *